(12) United States Patent
Krieg

(10) Patent No.: US 11,156,259 B2
(45) Date of Patent: Oct. 26, 2021

(54) FIBRE COMPOSITE COMPONENT

(71) Applicant: SOGEFI HD SUSPENSIONS GERMANY GmbH, Hagen (DE)

(72) Inventor: Nikolaj Krieg, Hagen (DE)

(73) Assignee: SOGEFI HD SUSPENSIONS GERMANY GMBH, Hagen (DE)

(*) Notice: Subject to any disclaimer, the term of this patent is extended or adjusted under 35 U.S.C. 154(b) by 390 days.

(21) Appl. No.: 16/301,037

(22) PCT Filed: Jun. 7, 2017

(86) PCT No.: PCT/EP2017/063783
§ 371 (c)(1),
(2) Date: Nov. 13, 2018

(87) PCT Pub. No.: WO2017/220321
PCT Pub. Date: Dec. 28, 2017

(65) Prior Publication Data
US 2019/0178324 A1  Jun. 13, 2019

(30) Foreign Application Priority Data

Jun. 22, 2016 (DE) .......................... 202016103285.7

(51) Int. Cl.
*F16F 1/368* (2006.01)
*B60G 11/02* (2006.01)
(Continued)

(52) U.S. Cl.
CPC .............. *F16F 1/368* (2013.01); *B60G 11/02* (2013.01); *B60G 11/12* (2013.01); *F16F 1/3686* (2013.01);
(Continued)

(58) Field of Classification Search
CPC .. F16F 1/368; F16F 1/3686; F16F 2230/0005; F16F 2224/0241;
(Continued)

(56) References Cited

U.S. PATENT DOCUMENTS

| 3,376,033 A | 4/1968 | Sherwood |
| 4,468,014 A * | 8/1984 | Strong ..................... F16F 1/368 188/268 |

(Continued)

FOREIGN PATENT DOCUMENTS

| DE | 102006047412 A1 | 6/2007 |
| DE | 102010009528 A1 | 9/2011 |

(Continued)

OTHER PUBLICATIONS

International Search Report dated Dec. 28, 2017 in parent PCT application PCT/EP2017/063783.
(Continued)

*Primary Examiner* — Robert A. Siconolfi
*Assistant Examiner* — San M Aung
(74) *Attorney, Agent, or Firm* — Polson Intellectual Property Law, PC; Margaret Polson; Christopher Sylvain

(57) ABSTRACT

Described is a fibre composite component designed as a spring, comprising at least one spring section and at least one force transfer structure (2). In the end portion forming or surrounding the force transfer element (3) the fibre composite material of the fibre composite component (1) is divided, in a plane perpendicular to the longitudinal direction of the force transfer structure (2), into at least two fibre composite material strands (4, 4.1, 4.2). Two adjacent fibre composite strands (4, 4.1, 4.2) run in opposite directions, overlapping over a specific angular portion and each forming an eye, with their mutually opposed side faces (7) force-transmittingly connected in the overlapping portion.

19 Claims, 3 Drawing Sheets

Figure 1:
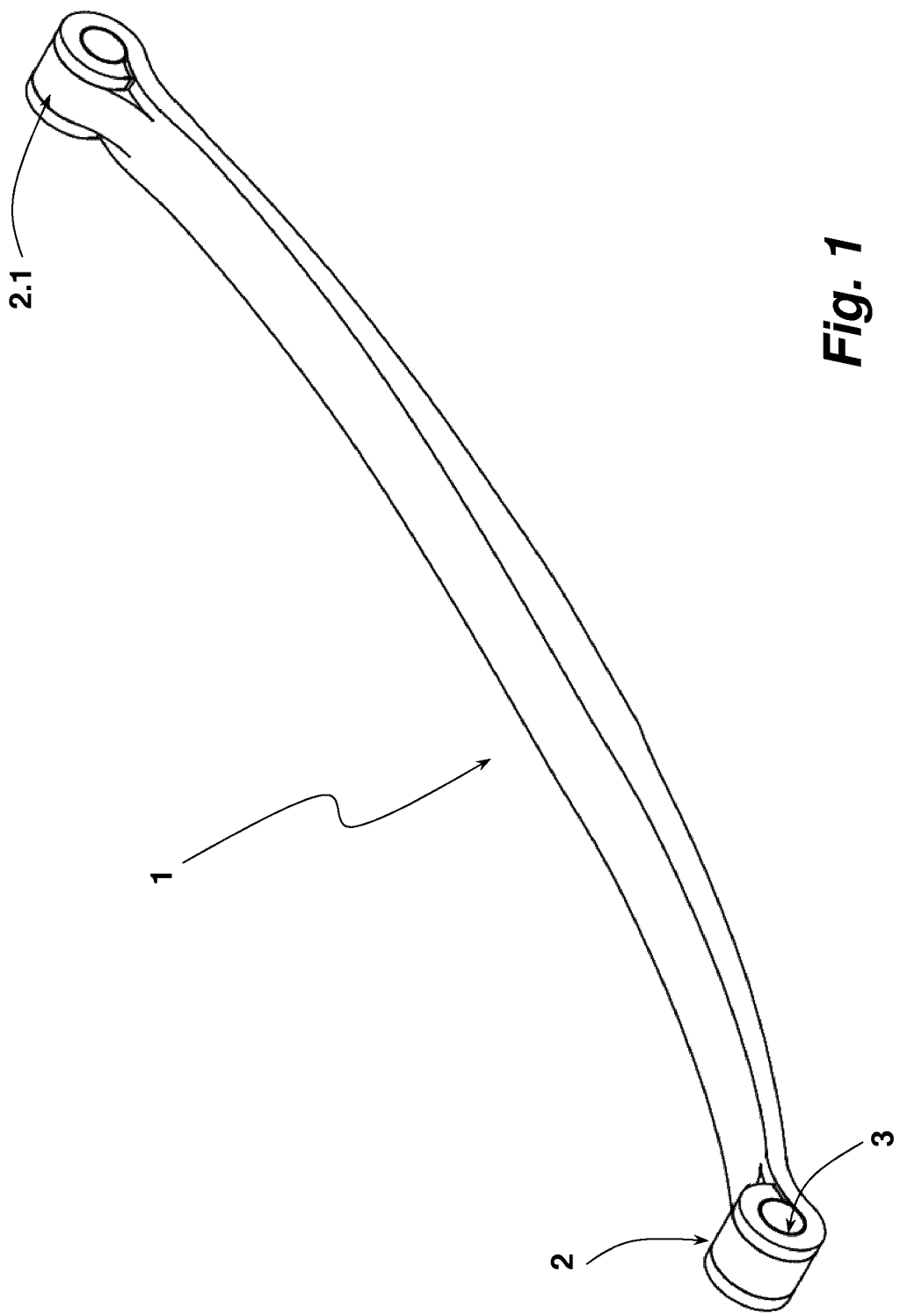

(51) Int. Cl.
B60G 11/12 (2006.01)
B29C 70/48 (2006.01)

(52) U.S. Cl.
CPC .......... *B29C 70/48* (2013.01); *B60G 2202/11* (2013.01); *B60G 2204/121* (2013.01); *B60G 2206/428* (2013.01); *B60G 2206/7101* (2013.01); *F16F 2224/0241* (2013.01); *F16F 2230/0005* (2013.01); *F16F 2238/022* (2013.01)

(58) Field of Classification Search
CPC .... F16F 2238/022; B60G 11/02; B60G 11/12; B60G 2206/428; B60G 2206/7101; B60G 2204/121; B60G 2202/11; B29C 70/48
USPC .......................................................... 267/47
See application file for complete search history.

(56) References Cited

U.S. PATENT DOCUMENTS

| | | | | |
|---|---|---|---|---|
| 4,546,958 | A | * | 10/1985 | Ohno ...................... F16F 1/368 267/148 |
| 4,556,204 | A | * | 12/1985 | Pflederer ............... F16F 1/3686 267/148 |
| 9,194,451 | B2 | * | 11/2015 | Voigt ...................... F16F 1/368 |

FOREIGN PATENT DOCUMENTS

| | | |
|---|---|---|
| EP | 1308265 A1 | 5/2003 |
| FR | 598724 | 12/1925 |
| FR | 2587649 A1 | 3/1987 |
| JP | S59-6443 A | 1/1984 |

OTHER PUBLICATIONS

International Preliminary Report on Patentability, Ch II, dated Jun. 8, 2018 in parent PCT application PCT/EP2017/063783.

Office Action dated Mar. 30, 2021 in related Japanese application No. 2018-566973 [references cited therein were previously cited in the IDS filed Jan. 8, 2019].

Office Action dated Aug. 3, 2021 in related Japanese application No. 2018-566973.

* cited by examiner

FIBRE COMPOSITE COMPONENT

The invention relates to a fiber composite component embodied as a spring, comprising at least one spring section and at least one load introduction structure.

Fiber composite components are used in many applications to replace structural components which are typically produced from steel. Such structural components can also be, for example, springs or spring elements, such as vehicle springs, for example, parts of wheel suspensions, such as suspension arms or leaf springs. Such fiber composite components are elongated, since the longitudinal extension thereof is many times greater than the extension in the transverse direction thereto, and therefore in relation to the width and the height of such a component. Such components have at least one load introduction structure for the attachment to other components. It is typically embodied as an eye. In conventional forged components of the type under discussion, such eyes are generally closed. In leaf springs, in which the eyes are created by a rolling procedure, they are sometimes also open. An attachment pin, which protrudes from the component at one end thereof on one or both sides transversely to the longitudinal extension thereof, can also be used as the load introduction structure in such components.

Fiber composite components of the type under discussion are previously known. In DE 10 2006 047 412 B1, for example, a rod-shaped fiber composite structure having load introduction elements is described. This fiber composite structure is a structural component of a hydraulic actuator. This previously known fiber composite structure is composed of two half-shells, which are enclosed by a bandage having circumferential fiber reinforcement.

DE 10 2010 009 528 A1 discloses a fiber composite component embodied as a leaf spring. A bearing eye is provided as the load introduction structure in this previously known fiber composite component. To construct this load introduction structure, a sleeve is used as a load introduction element, which is wrapped around by the end section of the fiber composite material. To form a closed eye from the fiber composite material, it is cut to size in the region of its end to form a narrower tongue. An opening, into which the end-side tongue is inserted after wrapping around the sleeve, is cut out in alignment with this end-side tongue in the prepreg strips used to form the fiber composite component. The end section of the tongue protruding from the opening is severed. In this manner, the end-side end face of the prepreg strip is led back, after wrapping around the sleeve as the load introduction element, to the end of the actual spring section in this respect.

The risk of a delamination of the fiber composite material used for the production of the fiber composite component is problematic in fiber composite components of the type under discussion in the event of a load, in particular in the event of a shear and/or tension load. This is undesirable, since this results in a failure of the fiber composite component.

Although the risk of a delamination is improved in relation to other fiber composite components, in which a load introduction structure is formed by a loop, using the fiber composite component previously known from DE 10 2010 009 528 A1, the carrying capacity of such a fiber composite component is generally excessively low, above all in the event of dynamic loads. This could be compensated for by a correspondingly broader design of the leaf spring. However, the installation space required for this purpose is often not available. In addition, more material in turn has to be used, which has a disadvantageous effect on the desired weight savings, which are to be caused by this fiber composite component. Moreover, elevated costs are to be expected.

Proceeding from this discussed prior art, the invention is therefore based on the object of providing a fiber composite component, which not only permits high loads with an acceptable use of material, but rather in which moreover the risk of a delamination is reduced in relation to a fiber composite component, the load introduction structure of which is provided by a fiber composite material loop.

This object is achieved according to the invention by a fiber composite component of the type in question as mentioned at the outset, in which the fiber composite material of the fiber composite component is divided in the end section forming or encompassing the load introduction element, in a plane transverse to the longitudinal extension of the load introduction structure, into at least two fiber composite material strands and two adjacent fiber composite material strands are each guided in opposite directions while forming an overlap extending over a specific angle amount to each form an eye and are connected to one another in a friction-locked manner with the lateral faces facing toward one another, in the section in which they are arranged overlapping.

In this fiber composite component, the load introduction structure is formed by at least two fiber composite material strands. The load introduction structure is typically an eye, which can be embodied as an open eye or also as a closed eye. The special feature in the fiber composite component according to the invention is that the wrapping or winding direction of adjacent fiber composite material strands is in opposite directions to form the load introduction structure. This means that for the case in which a first fiber composite material strand is guided clockwise to form an eye, while in contrast the one or the two adjacent fiber composite material strands are guided in the opposing wrapping or winding direction and therefore counterclockwise. The wrapping amount with which the fiber composite material strands are guided to form the eye of the load introduction structure is at least sufficiently large that adjacent fiber composite material strands are overlapping over a specific angle amount. In the overlapping region, the sides of these fiber composite material strands facing toward one another adjoin one another in the region of the overlapping arrangement. These lateral faces are moreover connected to one another in a friction-locked manner, typically integrally joined by the cured resin of the fiber composite component. It is advantageous that with this design, the fiber composite material is divided in the region of its at least one load introduction structure in a plane transverse to the longitudinal extension of its eye. The amount of the wrapping of the load introduction element is therefore solely dependent on the length of the fiber composite material strands. The remaining design of the fiber composite component is therefore uninfluenced by the formation of the load introduction structure by way of this concept. The load introduction structure can therefore be designed independently of the remaining elements of the fiber composite component. This also applies, vice versa, to the design of the remaining parts of the fiber composite component in relation to the load introduction structure.

The overlap with respect to the opposing wrapping directions of adjacent fiber composite material strands enables the formation of a planar contact, in particular also over a large area, of two adjacent fiber composite material strands. The bonding of adjacent fiber composite material strands to one another ensures that high forces can be introduced into the load introduction structure and moreover delamination is effectively prevented. The large-area bond of adjacent fiber composite material strands contributes, if a load introduction element is provided, to this element being securely accommodated in the fiber composite structure of the load introduction structure. Such a load introduction element, which is enclosed by the composite fiber material strands, can be, for example, a metal sleeve.

An eye is preferably formed over more than 270° by each fiber composite material strand. The lateral contact face of these fiber composite material strands then extends over at least 90°. The eyes formed by the fiber composite material strands, which jointly form the eye of the load introduction structure, are preferably embodied as closed or approximately closed, however. The frontal joint of the fiber composite material strands is then guided up to or almost up to the surface of the remaining part of the fiber composite material. A closed eye is then formed by each fiber composite material strand by way of the resin used for the final formation of the fiber composite component, by which a remaining gap between the returned end face of such a fiber composite material strand is also filled.

It is moreover particularly advantageous of such a fiber composite component having its fiber composite material strands divided in a plane transversely to the longitudinal extension of the load introduction element at the end to form a load introduction structure that the load introduction structure can be adapted with respect to its load introduction characteristic to the requirements in the application or in the use of such a fiber composite component. Depending on the load to be expected, it can certainly be provided that the cross-sectional area of the total of the fiber composite material strands which form an eye in a first wrapping direction is different from the total cross-sectional area of the fiber composite material strands by which the corresponding eye or eyes are formed in the other wrapping direction. A load introduction structure may be designed symmetrically or asymmetrically with respect to the central transverse plane of the load introduction structure using this concept. An asymmetrical design suggests itself for such applications, for example, in which torsional loads have to be absorbed via the load introduction structure, when these loads engage from a specific functional direction.

The number of the fiber composite material strands by which the eye of a load introduction structure is formed and/or enclosed is at least two. However, an odd number of fiber composite material strands is preferably selected to be able to design the alternation of an opposing wrapping direction symmetrically proceeding from its central transverse plane in both directions. This relates to the alternation and not necessarily to the width of each fiber composite material strand. The greater the number of the composite material strands is, in which adjacent fiber composite material strands are each wrapped around in opposite directions to form the eye of the load introduction structure, the higher is the carrying capacity of the load introduction structure thus provided. For many applications, it will be sufficient if the number of the fiber composite material strands is 3 or 5.

Unidirectionally oriented fibers, as well as fiber strands, such as woven fiber material, fiber nonwoven material, or the like can be used as the fiber composite material. If fiber strands which can readily be divided into the required fiber composite material strands in the end region thereof are not used, the end section, at which a load introduction structure is to be formed, is divided by one or more cuts into the fiber composite material strands required for the wrapping in opposite directions.

Such a fiber composite component can have such a load introduction structure at multiple points. If the fiber composite component is a leaf spring, for example, it will be equipped with such a load introduction structure at its two ends. Such a fiber composite component can certainly also be a frame, an auxiliary frame, a suspension arm, or the like, which has at least one such load introduction structure.

In one exemplary embodiment, a common load introduction element, for example, a metal sleeve, is enclosed by the eyes of the fiber composite material strands of such a load introduction structure. The cross-sectional area of such a metal sleeve may have a circular cross-sectional area. Because of the enclosure of such a load introduction element in the above-described manner, the cross-sectional area of such a load introduction element can also deviate from the round shape, for example, it can also be embodied as rectangular.

The spring characteristic curves of such a spring produced as a fiber composite component, for example, a leaf spring, can be set, inter alia, via the fiber volume content of the fiber composite component. The fiber volume content specifies the volumetric proportion of the fibers used, typically glass fibers, of the specific geometry of the component. The fiber volume content in relation to the cross-sectional area of such a fiber composite component designed as a spring thus specifies the proportion of fibers in relation to the cross-sectional area. Such a fiber composite component designed, for example, as a parabolic spring can have a constant fiber volume content over the extension of its spring section, in this case: its spring arm. Because of the reduction of the cross-sectional area in the direction toward the load introduction element, the actually used fiber quantity decreases in this direction with constant fiber volume content. In order to reduce notching effects in the event of spring stresses, for example, a deflection, the cover layers of the fiber strands are embodied as continuous. The fiber volume content can be reduced in the end sections forming or enclosing a load introduction element in relation to that in the spring section, i.e., for example, in the spring arm. The circumstance is utilized in this case that these end sections have to bear less strain in the fiber longitudinal direction and primarily have inter-laminar load. Rather, it is provided that these end sections are also not to react elastically, in any case not noticeably, which is ensured by the elevated resin proportion. The lower use of fiber strands has a weight-reducing effect on the fiber composite component. The cover layers of the fiber strands are typically also continuous in the transition into an end section formed in this manner. It is also advantageous in the case of such a design that the injection compound may be distributed better during infusion processes already at lower pressure into the mold forming such an end section. The reason for this is the smaller number of fiber strands, which impair the flow behavior of the injected compound, in the at least one end section. Experiments have shown that in the at least one end section, the fiber volume content could be reduced by up to 50% with equal fiber composite component quality. The amount of such a fiber volume content reduction in the at least one end section will be designed depending on the application intended for the fiber composite component.

The variation in the fiber volume content over the longitudinal extension of the fiber composite component designed as a spring represents a further influencing option for the design of such fiber composite components. The design freedom in the conception of such a fiber composite component embodied as a spring is thus enhanced in relation to those which are conventionally, produced from steel, in particular without having to take influence on the production method.

A further degree of freedom in the design of such a fiber composite component embodied as a spring is that the fiber volume content can be at least partially differing in the fiber composite material strands. Thus, for example, fiber composite material strands which are arranged adjacent to one another in the transverse direction with respect to the spring can have an equal fiber volume content, while the composite material fiber strands located above or below have a different fiber volume content. It is also possible to arrange fiber composite material strands having different fiber volume content in the transverse direction of the fiber composite component.

Figure 2:
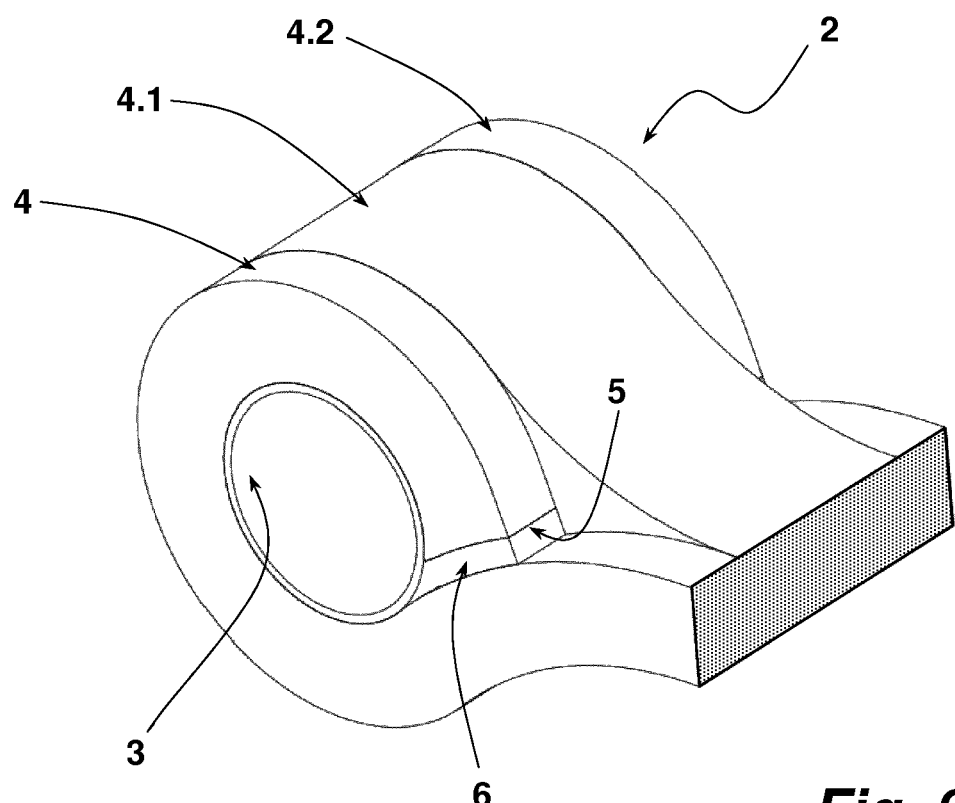
Figure 4:
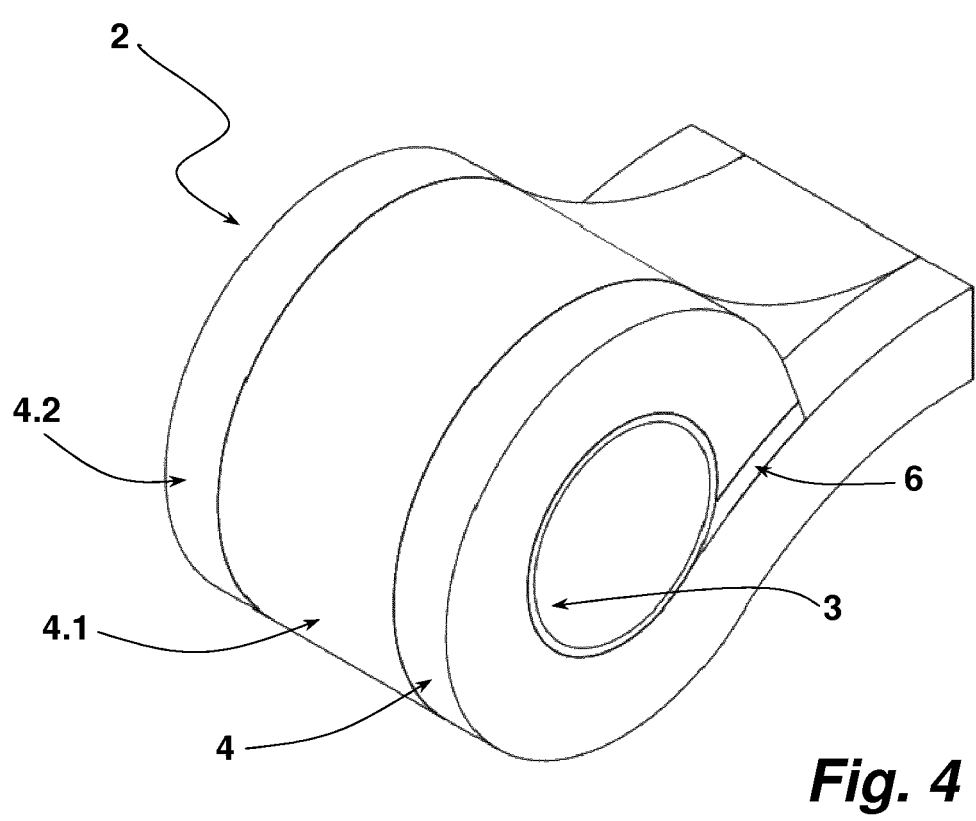
Figure 3:
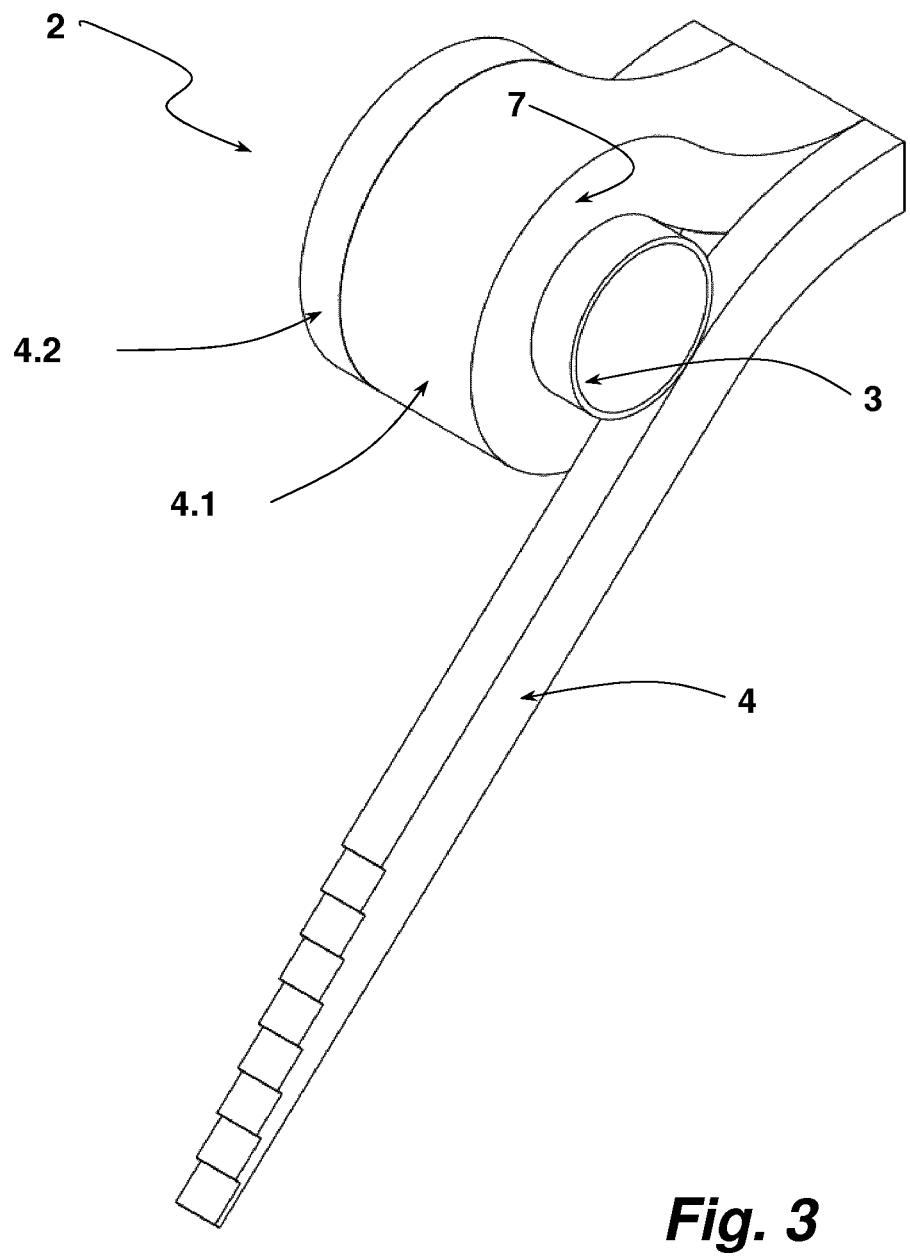

The invention is described hereafter on the basis of an exemplary embodiment with reference to the appended figures. In the figures:

FIG. 1: shows a perspective illustration of a leaf spring manufactured as a fiber composite component for a vehicle, FIG. 2: shows an enlarged perspective partial view of the left load introduction structure of the leaf spring of FIG. 1, FIG. 3: shows the load introduction structure of FIG. 2 from another perspective having a partially unwound fiber composite material strand, which is wrapped around a load introduction element, and FIG. 4: shows the load introduction structure of FIG. 3 in the same perspective, having the fiber composite material strand enclosing the load introduction element.

FIG. 1 shows a leaf spring 1 manufactured as an elongated fiber composite component. The lease spring 1 has been brought into its form shown in FIG. 1 from a fiber composite material. Fiber strands have been used as the fiber composite material in the exemplary embodiment of FIG. 1. The fiber composite leaf spring 1 has been produced in the course of a resin injection molding method (resin transfer molding) known per se. In this method, the fiber strands used as a textile semifinished product are laid into a mold. In a subsequent step, the resin is injected into the cavity of the mold, in which the fiber strands are arranged in the desired shape. The leaf spring shown in FIG. 1 may also be produced using prepregs.

The leaf spring 1 respectively supports a load introduction structure 2, 2.1 at its two ends. The load introduction structure 2 is described in greater detail hereafter. The load introduction structure 2.1 is identically constructed in the illustrated exemplary embodiment. The statements in this respect therefore apply similarly to the load introduction structure 2.1.

The load introduction structure comprises a metal sleeve 3, by which an eye is provided, as a load introduction element. The metal sleeve 3 is enclosed by the fiber composite material along its radial lateral surface. The manner of the enclosure of the sleeve 3 forming the eye is a special feature in the load introduction structure 2. FIG. 2 shows the load introduction structure 2 of the leaf spring 1 in a section at the end of the actual leaf spring. The sleeve 3 is wrapped around by three fiber composite material strands 4, 4.1, 4.2 in the illustrated exemplary embodiment. The fiber composite material strands 4, 4.1, 4.2 are guided around the sleeve 3 with different wrapping directions. The fiber composite material strand 4 is wrapped clockwise around the lateral surface of the sleeve 3 in the view of FIG. 2. The fiber composite material strand 4.2 is also guided in the same wrapping direction. In contrast, the fiber composite material strand 4.1 located between the two fiber composite material strands 4, 4.2 is guided counterclockwise and therefore in the opposite direction to the fiber composite material strands 4, 4.2 around the sleeve 3. All three fiber composite material strands 4, 4.1, 4.2 are guided approximately 360° around the lateral surface of the sleeve 3. The remaining gusset between the respective end-side end face, as shown on the end face 5 of the fiber composite material strand 4, and the upper side of the beginning of the strands 4, 4.1, 4.2 is filled using the resin used for curing. This gusset filled with resin is indicated in FIG. 2 by the reference sign 6. A closed eye is thus laid around the radial lateral surface of the sleeve 3 in the exemplary embodiment shown by each fiber composite material strand 4, 4.1, 4.2.

The fiber composite material strands 4, 4.1, 4.2 are divided in the transverse plane of the longitudinal extension of the sleeve 3 and therefore in the extension of the longitudinal direction of the leaf spring 1, in order to enable the above-described wrapping in opposing directions of adjacent fiber composite material strands 4, 4.1 or 4.1, 4.2, respectively, of the sleeve 3.

Due to the wrapping in opposing directions of the sleeve 3 by the fiber composite material strands 4, 4.1, 4.2, the load introduction structure 2 can be subjected to particularly high loads. Tension or also shear forces acting on the sleeve 3 and thus on the load introduction structure 2 are always proportionally introduced at least into a section close to the leaf spring of a fiber composite material strand 4, 4.2 or 4.1 independently of the direction thereof.

Opening of the wrapping of the fiber composite material strands 4, 4.1, 4.2 if particularly high tension forces arise is effectively prevented in that they are integrally bonded to one another over a large area by the resin used on the sides facing toward one another and therefore in the direction of the longitudinal extent of the sleeve 3 to produce the leaf spring 1. For this reason, adjacent fiber composite material strands 4, 4.1 or 4.1, 4.2, respectively, are guided around the sleeve 3 far enough that they overlap in a section. In the exemplary embodiment shown, the overlap is somewhat less than 360°.

To illustrate the above-described wrapping, FIG. 3 shows the load introduction structure 2 with the fiber composite material strand 4 partially unwrapped from the sleeve 3. The bonding of adjacent fiber composite material strands, here: the fiber composite material strand 4 and the fiber composite material strand 4.1, takes place via the adjoining lateral faces 7, which are integrally bonded and therefore connected to one another in a friction-locked manner via the resin. Since in the illustrated exemplary embodiment, the wrapping of the sleeve 3 by the fiber composite material strands 4, 4.1, 4.2 takes place over almost 360°, the contact surface of two adjacent fiber composite material strands is particularly large. It is of interest that as a result of the wrapping in opposite directions of the sleeve 3 by the fiber composite material strands 4, 4.1, 4.2, they also can only be detached from the lateral surface of the sleeve 3 in opposite directions in the event of a tensile stress. However, this is effectively suppressed by the integral bond between the adjacent fiber composite material strands 4, 4.1 and 4.1, 4.2. The bonding is readily sufficiently strong for the resin used for the curing of the fiber composite component in order to withstand such shear forces.

FIG. 4 shows the load introduction structure 2 from the perspective of the illustration of FIG. 3 with the fiber composite material strand 4 integrally bonded on the lateral face 7.

In the illustrated exemplary embodiment, the wrapping of the metal sleeve 3 is constructed symmetrically with respect to its central transverse plane. It can also be designed asymmetrically if this is required by corresponding demands. In the illustrated exemplary embodiment, the cross-sectional area of the fiber composite material strand 4.1 is greater than the total of the cross-sectional areas of the fiber composite material strands 4, 4.2, specifically in a ratio of approximately 5:3.

Using the above-described concept, any load introduction structure 2, 2.1 can therefore be optimally designed for the respective demands acting thereon. In particular, the load introduction structures 2, 2.1 do not have to be identical, as is the case in the illustrated exemplary embodiment. It is entirely possible, for example, to design the front load introduction structure in the travel direction differently with respect to the design of the wrapping of the metal sleeve 3 than the rear load introduction structure in the travel direction.

In the described exemplary embodiment, the fiber volume content is constant over the length of the leaf spring 1.

Simulations with respect to the durability of the leaf spring 1 in comparison to a conventional leaf spring manufactured as a fiber composite component illustrate the significantly better properties. A leaf spring as described in DE 10 2010 009 528 A1 is used as the comparison leaf spring. The dimensions of both leaf springs which were subjected to the simulation were identical. During the simulation, the strain of these leaf springs during use in a minivan was simulated. The load cases studied show the significantly improved properties of the leaf springs according to the invention. In the following table, the percentage proportion of the transverse tensile stresses resulting during the simulation is indicated as the proportion of the ascertained transverse tensile stresses of the comparison springs, the values of which are scaled to 100%, for each of the respective leaf springs according to the invention:

| load case | ascertained transverse tensile stress |
|---|---|
| dynamic vertical strain | 30% |
| braking forward | 40% |
| braking reverse | 90% |
| cornering | 30% |
| axle articulation | 30% |

The results show that because of the special manner of the design of the load introduction structures, the transverse tensile stresses introduced in the respective load cases are significantly less than is the case in the comparison leaf spring.

The invention has been described by way of example on the basis of a parabolic spring. It is self-evident that the concept of the invention may also be used in other parts, in particular also suspension parts, for example, stabilizers or suspension arms. Such a fiber composite component may also be used to form stop means or hooks or eyes used in another context.

LIST OF REFERENCE NUMERALS

1 leaf spring
2, 2.1 load introduction structure
3 metal sleeve
4, 4.1, 4.2 fiber composite material strand
5 end face
6 gusset
7 lateral face

The invention claimed is:

1. A fiber composite component, designed as a spring, comprising:
    at least one spring section and at least one load introduction structure, the load introduction structure provided in at least one end section of the fiber composite component and including a load introduction element,
    wherein fiber composite material of the fiber composite component is divided into at least two fiber composite material strands in the end section forming or enclosing the load introduction element in a plane transversely to the longitudinal extension of the load introduction structure,
    wherein two adjacent fiber composite material strands are guided in inverse wrapping directions to one another in the end section, while overlapping through a section extending over a particular angular amount, and facing side surfaces of the two adjacent fiber composite material strands are connected to one another in a non-positive manner in the section in which the two adjacent fiber composite material strands are arranged in an overlapping manner in order to form a respective eye.

2. The fiber composite component of claim 1, wherein an odd number of fiber composite material strands participate in the construction of the load introduction structure.

3. The fiber composite component of claim 1, wherein the individual fiber composite material strands are equal in cross-sectional area.

4. The fiber composite component of claim 1, wherein the total cross-sectional areas of the fiber composite material strands in the two inverse wrapping directions are equal.

5. The fiber composite component of claim 1, wherein the eye formation by the fiber composite material strands is provided symmetrically with respect to the central transverse plane of the longitudinal extension of the load introduction structure.

6. The fiber composite component of claim 1, wherein the eye formation by the fiber composite material strands is provided asymmetrically with respect to the central transverse plane of the longitudinal extension of the load introduction structure.

7. The fiber composite component of claim 1, wherein the eye formation by the fiber composite material strands is provided as a closed eye in each case.

8. The fiber composite component of claim 1, wherein the fiber composite material of the fiber composite component are fiber strands.

9. The fiber composite component of claim 8, wherein the fiber volume content differs in individual fiber strands.

10. The fiber composite component of claim 9, wherein the fiber volume content in the at least one end section is less than in the spring section formed thereon.

11. The fiber composite component of claim 10, wherein cover layers of the fiber strands are continuous.

12. The fiber composite component of claim 10, wherein the fiber volume content in the at least one end section is 5% to 30% less than in the spring section.

13. The fiber composite component of claim 12, wherein cover layers of the fiber strands are continuous.

14. The fiber composite component of claim 1, wherein the load introduction element is wrapped by the fiber composite material strands.

15. The fiber composite component of claim 14, wherein the load introduction element is a metal sleeve.

16. The fiber composite component of claim 1, wherein the fiber composite component is elongated and has a load introduction structure at both of its ends.

17. The fiber composite component of claim 16, wherein the fiber composite component is a part of a wheel suspension of a vehicle.

18. The fiber composite component of claim 17, wherein the fiber composite component is a leaf spring.

19. The fiber composite component of claim 18, wherein the fiber composite component is a parabolic spring.

* * * * *